Aug. 14, 1928.
H. M. BOWDEN
1,681,090
BRAKE BEAM ASSEMBLY
Filed May 29, 1925
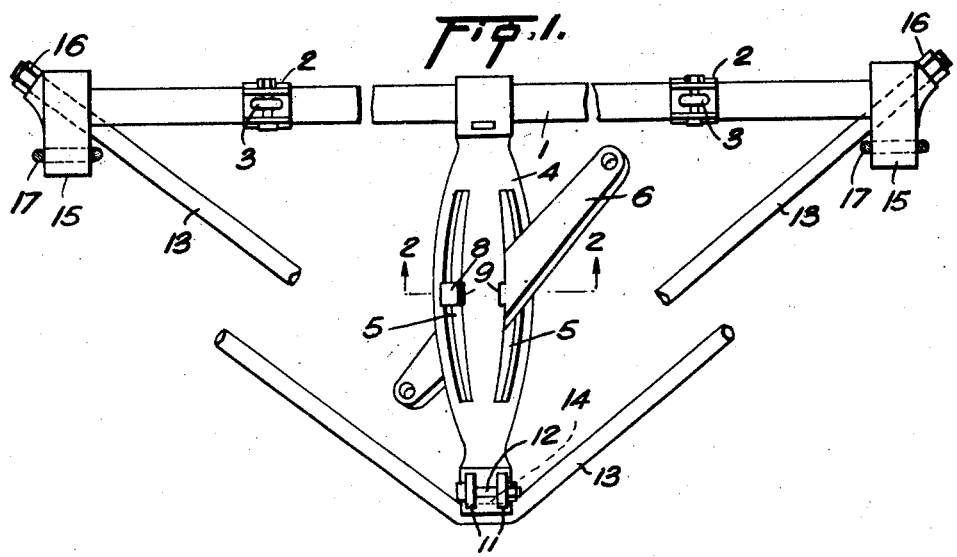
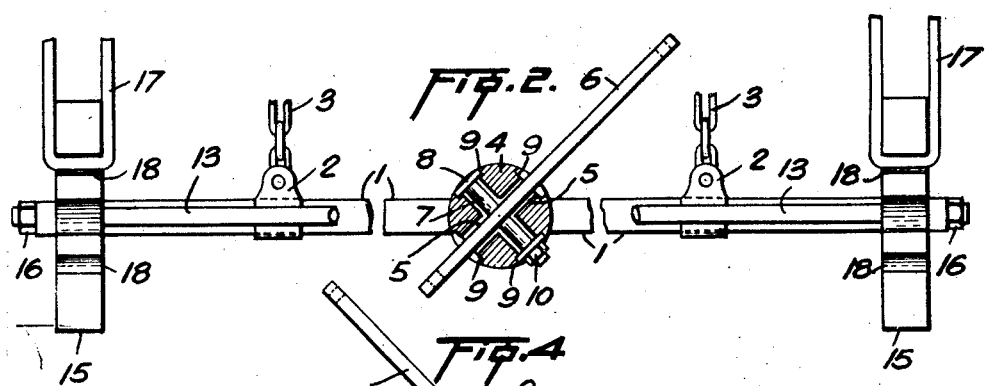
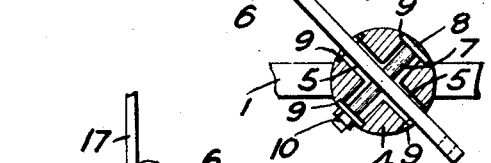 
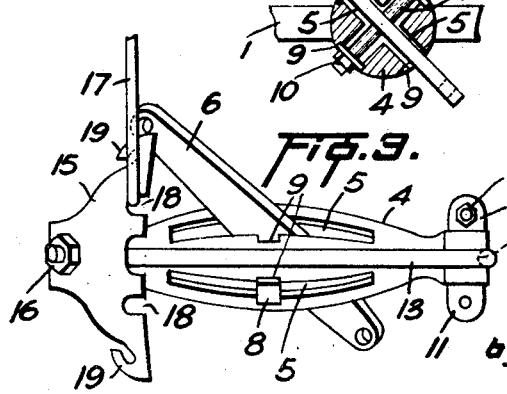
Inventor:
H. M. Bowden Patented Aug. 14, 1928.

1,681,090

UNITED STATES PATENT OFFICE.

HENERY MURLEY BOWDEN, OF ALLANDALE, ONTARIO, CANADA.

BRAKE-BEAM ASSEMBLY.

Application filed May 29, 1925. Serial No. 33,800.

My invention relates to improvements in brake beam assembly and the object of the invention is to devise a beam which will be reversible and which can be attached to any railway truck in any position in which such a brake beam is used without having to change or re-assemble the parts of the assembled brake beam in any shape or form.

A further object is to devise a brake beam strut in which the lever can be attached thereto to suit either a right hand or a left hand throw, whether the strut is in the ordinary position or in the inverted position.

My invention consists of a brake beam assembly constructed and arranged all as hereinafter more particularly described and illustrated in the accompanying drawing in which:

Fig. 1 represents a plan view of my beam assembly showing the brake beam and brace rod broken away intermediately.

Fig. 2 is a front elevation thereof partly in section, the section being taken through the line 2—2 Figure 1.

Fig. 3 is a side elevation.

Fig. 4 is a cross sectional view through the strut showing the lever so connected to the strut as to give an opposite throw to that illustrated in Figure 2, and Fig. 5 is an elevational detail of a hanger ring used where the beam is applied to railway tender and street car trucks.

Like characters of reference indicate corresponding parts in the different views.

1 is the brake beam. 2 are the usual clips to which the chains 3 are secured, said chains being attached in the usual manner to the truck frame (not shown). 4 is the brake beam strut provided with slots 5 extending therethrough at right angles to each other, the inclination of such slots being substantially 45°.

6 is a lever which is connected at one end to the air brake cylinder rod in the usual manner, the other end being anchored in the orthodox way. 7 is a pivot pin adapted to be inserted through the orifice 5 and held in position by having its head 8 countersunk into indentures 9 in the walls of such slot 5. The pivot pin 7 extends freely through the lever 6 and the other end of such pivot pin is preferably threaded and the nut 10 is screwed thereon.

11 are pairs of spaced apart upper and lower lugs secured to the forward end of the strut 4 and adapted to receive the bolt 12.

The bolt 12 is connected to the usual chain 11 which is in turn connected to the truck frame. The chain or truck are not shown as they form no part of the present invention.

13 is a brake beam brace rod suitably bent and its intermediate portion inserted into a semi-circular indenture 14 in the front face of the strut 4, the ends of the brace rod being threaded and extending freely through the brake shoe heads 15. Nuts 16 are threaded onto the ends of the brace rods for securing them in position.

17 are hangers for the shoe heads, said hangers being substantially U-shaped and inserted into the horizontal slots 18 in the brake shoe heads 15.

On reference to Figures 3 and 4 it will be noted that two slots 18 are provided in each brake shoe head in order that the whole beam may be turned over and hung upside down instead of in its usual position, thus obviating the necessity of having to change the brake shoe heads.

Similarly, hooks 19 are provided at top and bottom of the brake shoe heads 15 to receive the hangers 20 which may be used alternatively to the hangers 17, depending upon the particular truck to which the brake beam assembly is applied.

The hangers 17 are preferably used when the brake beam is applied to coach trucks but where the brake beam is applied to railway tender trucks or to street car trucks, the hangers 20 of ring form are used instead.

Either of these hangers are intended to replace the ordinary bar on the truck upon which the beam falls should the chains 3 give way.

In railway practice it is found that should a brake beam become broken there is frequently in the repair shop a shortage of brake beam assemblies in which the lever 6 has the required throw so that it is necessary to assemble a brake beam for the particular job. With my invention no matter which brake beam on the truck has become damaged, a spare brake beam constructed according to my invention will be available and can be applied in any position to replace the damaged one, it only being necessary to place the lever 6 in the required slots 5 of the strut 4, depending upon whether a right or left hand throw is desired. This enables the repair shop to have the standard brake beam for replacement purposes, and similarly one standard strut can be stocked to replace broken ones, whereas, at the present time replacement struts with right and left hand throws must be kept.

It will also be noted that my brake shoe heads are reversible, thus enabling the brake beam to be turned upside down and to be used in the reverse position instead of having to take off the brake shoe heads and turn them up the other way. This is of advantage should the portion of the brake beam adjacent the slots 18 become broken off as the brake beam can be turned upside down and used in this position, thus enabling a repair job of this nature to be done on the road.

From the above description it will be apparent that I have devised a simple and effective brake beam which will effect a considerable saving in repair shops and doing away entirely with the use of left and right hand struts and brake shoe heads that are not reversible.

What I claim as my invention is:

In a brake beam assembly, the combination with the beam, of a strut therefor having two longitudinal slots extending through the strut and intersecting each other at substantially right angles, said slots having opposed corresponding indentures in the side walls at top and bottom of each, such indentures being positioned intermediately of the length of the slots, a lever extending through a slot in the beam, a pivot pin having an enlarged head inserted in opposed indentures in the slot, said pivot pin extending freely through slot and lever, a washer on the pin inserted into the other opposed indentures in such slot and a nut threaded on the end of the pin engaging the washer.

HENERY MURLEY BOWDEN.